Figure 1:
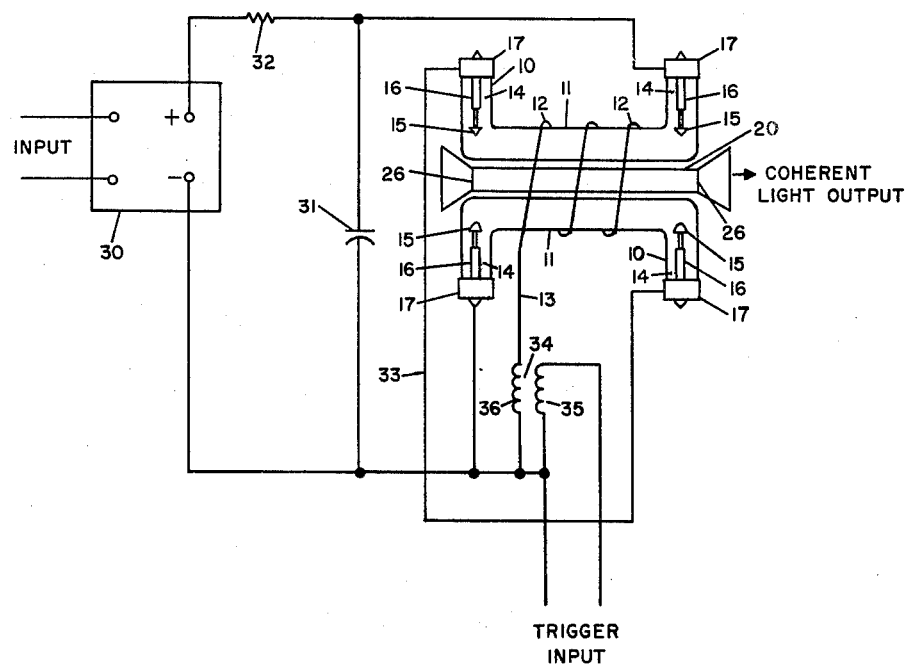

April 20, 1965     H. E. EDGERTON     3,179,897
EXCITATION SYSTEM FOR AN OPTICAL MASER
Filed Sept. 28, 1961     3 Sheets-Sheet 1

*INVENTOR.*
HAROLD E. EDGERTON
BY *Ralph L. Cadwallader*
ATTORNEY

April 20, 1965   H. E. EDGERTON   3,179,897
EXCITATION SYSTEM FOR AN OPTICAL MASER
Filed Sept. 28, 1961   3 Sheets-Sheet 2

*INVENTOR.*
HAROLD E. EDGERTON
BY
ATTORNEY

3,179,897
EXCITATION SYSTEM FOR AN OPTICAL MASER

Harold E. Edgerton, Cambridge, Mass., assignor to Edgerton, Germeshausen & Grier, Inc., Boston, Mass., a corporation of Massachusetts
Filed Sept. 28, 1961, Ser. No. 141,380
2 Claims. (Cl. 331—94.5)

This invention relates to apparatus for producing electromagnetic energy in the optical region directly from excited molecules or atoms, and has for its primary object the provision of means for concentrating more of the available optical pumping energy at the active medium than has heretofore been possible. A concomitant object is the provision of an optical maser wherein the amount of optical energy supplied is sharply reduced due to more efficient utilization thereof.

The first optical maser utilized pink ruby as the solid active medium. Ruby is aluminum oxide in which a few of the aluminum atoms have been replaced by chromium atoms; the more chromium the deeper the color. A pale pink ruby, for instance, may contain about 0.05 percent chromium. For use in an optical maser, the ruby is machined into a rod about one-half centimeter in diameter and its ends are polished optically flat and parallel and are partially silvered. The rod is placed near an electronic flash tube that provides broad-band pumping light. The chromium atoms in the crystal absorb a broad band of green and yellow light, along with ultraviolet light, and let only the red and blue pass through. The light that is absorbed raises the chromium atoms to an excited state from which two steps are required to carry them back to the ground state. In the first step they give up some of their energy to the crystal lattice and land temporarily in what is called a metastable state. If they are not subjected to stimulation, their stay at this level lasts a few milliseconds while they drop at random to the ground state. Photons emitted during this final drop have a wavelength, at room temperature, of 6,943 angstrom units. In an optical maser, however, the first few photons released at this wavelength stimulate the still excited chromium atoms to give up photons and tumble to the ground state much sooner than they would normally; the result is a cascade of photons at the 6,943 angstrom unit wavelength. Thus a wave that travels along the axis of the ruby rod will grow by stimulated emission until it reaches a mirror surface at one end. There it will be reflected back into the active medium and growth will continue. Finally, a portion of the wave can escape through one of the semi-transparent ends, constituting the output of the optical maser.

It was first discovered that a powerful electronic flash lamp connected to a large power supply was required to raise most of the chromium atoms to the excited state. Up to a certain critical flash intensity, all that happened was that the ruby emitted a burst of its own typical red fluorescence spread over the usual decay period for the excited atoms. But, above this critical flash intensity, maser action occurred, and an intense red beam, lasting for about one-half millisecond flashed out from the partially silvered ends of the rod. This showed that a sufficient excess of atoms had been pumped up to the excited state to make up for losses within the ruby rod. More than 2,000 watt-seconds of energy had to be discharged through a helical electronic flash tube to provide sufficient optical pumping energy for maser action to occur.

Materials other than pale pink ruby may be used as the active medium. For example, deep red ruby, or samarium or uranium ions in a calcium fluoride crystal, may be used. Other wave lengths produced by these are 7,009 and 7,041; 7,080; and 25,000 angstroms respectively.

In summary, my invention contemplates the use of a plurality of U-shaped flashtubes with their center sections arranged concentrically about the active medium. A common trigger is arranged as a reflector disposed around said center sections. The reflector concentrates the available optical pumping energy at the active medium. Means are also provided for mounting a variable number of said U-shaped flashtubes concentrically about the active medium.

Figure 2:
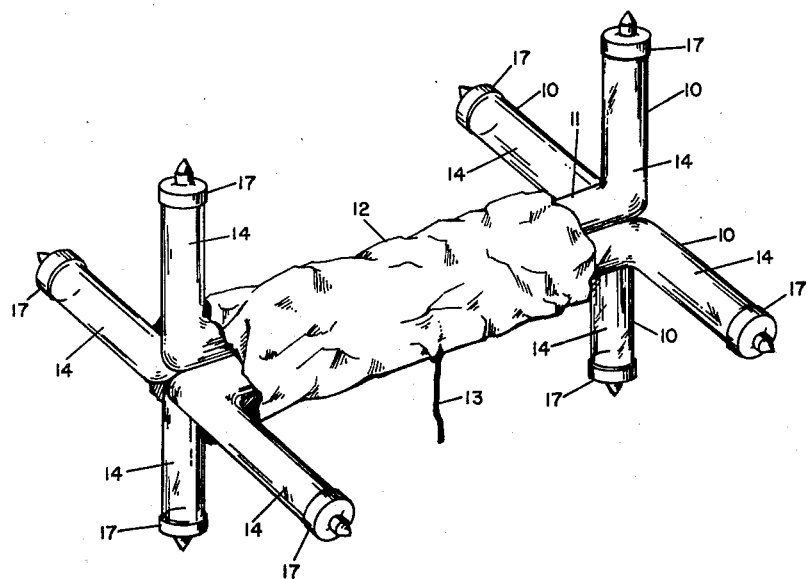
Figure 3:
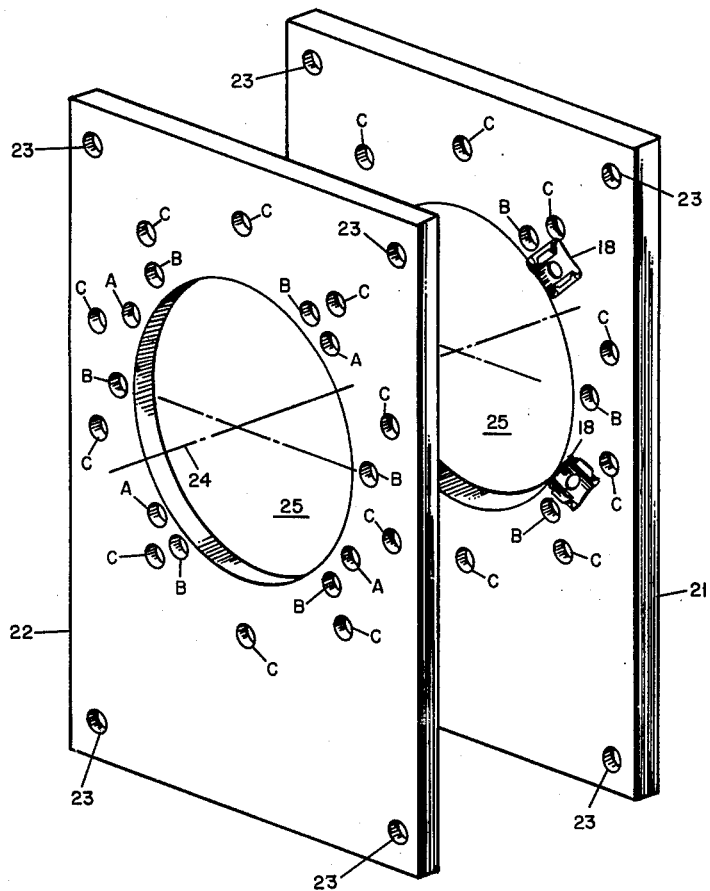

The principles of the invention, as well as other objects and advantages thereof, will appear from the following description of a preferred embodiment as shown in the accompanying drawings in which:

FIGURE 1 is a schematic illustration of my invention;
FIGURE 2 is a perspective view of an assembly of four of my U-shaped flashtubes; and
FIGURE 3 is a perspective view of the mounting supports for the flashtube assembly of FIGURE 2. Other constructional features are also shown.

FIGURE 2 illustrates an assembly of four of my U-shaped flashtubes 10. The center sections 11 of each are arranged parallel to each other and to the active medium 20 (see FIGURE 1). The center sections 11 may be placed in direct contact with active medium 20, or they may be displaced therefrom as illustrated in FIGURE 1 to permit forced flow of a coolant around active medium 20. The result of such close coupling of center sections 11 to active medium 20 is that more light energy is caused to impinge upon active medium 20 within a short period of time.

A conductive material 12 having a reflective inner surface is wrapped around center sections 11 as illustrated in FIGURE 2. The disposition of the reflective inner surface of conductive material 12 as close as possible to active medium 20 assures that light emanating away from active medium 20 travels the shortest distance possible from flashtubes 10 to said surface and back into active medium 20. The result is that more light energy impinges upon active medium 20 within the above-mentioned short period of time. Such a reflective material 12 may be degreased aluminium foil. Conductive material 12 is connected to conductor 13, the function, of which will be explained later.

As illustrated in FIGURE 1, short legs 14 of U-shaped flashtubes 10 contain the main discharge electrodes 15 connected by supports 16 to end caps 17. End caps 17 fit into fuse clips 18, two of which are shown mounted on support 21 of FIGURE 3. Suitable mounting means to fix the location of fuse clips 18 are well known in the art. Accordingly, they are omitted in FIGURE 3 to simplify the drawing.

Supports 21 and 22 may be mounted into an assembly (not shown) by means of mounting holes 23. Examination of support 22 of FIGURE 3 reveals that there are four holes labelled "A" located therein 90° apart at equal radii from axis 24. Fuse clips 18 are shown mounted on two "A" holes on support 21, but are not shown on support 22. It will be evident that the four flashtubes 10 of FIGURE 2 can be mounted between supports 21 and 22 by pressing end caps 17 into fuse clips 18 mounted on all "A" holes of supports 21 and 22.

Alternatively six flashtubes 10 can be mounted between supports 21 and 22 by pressing their end caps 17 into fuse clips 18 that may be mounted on all "B" holes, which, as illustrated, are located 60° apart at equal radii from axis 24. Likewise ten flashtubes 10 can be mounted to fuse clips 18 located at the "C" holes. Similarly, three, five, seven, eight, or nine flashtubes 10, for example, can be mounted.

It will be obvious that active medium 20 is mounted between supports 21 and 22 coaxial with axis 24 and extending through large holes 25. Suitable mounting means are well known in the art and are, therefore, not shown.

Flashtubes 10 may be flashed by any one of many well known discharge circuits. A standard circuit is illustrated in FIGURE 1 comprising capacitor charging circuit 30 that charges discharge capacitor 31 through limiting impedance 32. Discharge capacitor 31 is connected across the two flashtubes 10 which are connected in series by conductor 33. The series connection is made in such a manner that the discharge current flows through each of the plurality of flashtubes 10 in the same direction relative to active medium 20. Although flashtubes 10 are here illustrated as connected in series, they may, if desired, be connected in parallel.

One terminal of capacitor 31 may also be connected to a terminal of the secondary winding 36 and to a terminal of the primary winding 35 of pulse transformer 34, as illustrated. The other terminal of secondary winding 36 is connected to the conductive reflective material 12 (illustrated in FIGURE 1 as a trigger winding) by means of conductor 13. Primary winding 35 is connected to a trigger circuit (not shown) which may utilize a hydrogen thyratron to discharge a capacitor through primary winding 35, as is well known in the art.

In operation, capacitor 31 is charged and thereafter, as desired, a trigger pulse is delivered to pulse transformer 34. The high voltage on the secondary winding 36 appears on conductive reflective material 12 and creates ionizing potentials in flashtubes 10 ionizing sufficient gas therein for discharge capacitor 31 to discharge therethrough substantially simultaneously. A brilliant flash of light is produced by each flashtube. A major portion of the optical energy thus produced would be lost where it is not reflected by the interior reflective surface of conductive material 12. With this arrangement it is concentrated at the active medium 20.

As heretofore explained, if the active medium 20 is ruby, its chromium atoms are raised to the excited state by this optical pumping energy. As the excited atoms return to the ground state, photons are released within active medium 20 creating a light wave that travels back and forth between the semi-mirrored ends 26 (see FIGURE 1) until growth is sufficient for a portion of the wave to escape. I have, for example, produced maser action by discharging 250 watt-seconds into four U-shaped flashtubes 10 connected in series, arranged according to my disclosure herein, and disposed in contact with an active medium 20 comprising a ruby rod one-quarter inch in diameter by two inches long. This is approximately on order of magnitude reduction in the amount of energy originally thought necessary to produce maser action.

It is apparent that the embodiment herein disclosed is purely illustrative. For example, reflective material 12 need not be conductive if a separate trigger electrode (or electrodes) is provided for flashtubes 10. Similarly, the flashtubes need not be U-shaped; that is, a plurality of straight-line flashtubes may be mounted concentrically about active medium 20. Many modifications obviously can be made in construction and arrangement within the scope of my invention as defined in the appended claims.

I claim:

1. Excitation system for an optical maser having an elongated active medium adapted for excitation to generate maser action comprising a plurality of triggered electric flashtubes, each of said flashtubes being formed with a rectilinear central portion, said rectilinear central portions of said flashtubes being disposed concentrically about and having side walls closely coupled to said elongated active medium; a reflector means formed of a conductive sheet material and wound about said rectilinear central portions of said flashtubes in tangentially contacting relation thereto on the sides thereof opposite from the side walls closely coupled to said elongated active medium; an electric discharge system connected to said plurality of flashtubes and adapted to discharge therethrough when said flashtubes are triggered; a trigger transformer having a secondary winding connected to said conductive reflector means, whereby a single trigger pulse applied to said transformer causes said conductive reflector means to trigger said plurality of flashtubes permitting thereby said electric discharge system to discharge substantially simultaneously through said plurality of flashtubes to produce an intense, brilliant flash of light a substantial portion of which will be directed into said elongated active medium within a very short period of time.

2. The excitation system for an optical maser as defined in claim 1 in which said reflector means is formed of a conductive sheet material of degreased aluminum foil.

References Cited by the Examiner

UNITED STATES PATENTS

| 2,915,665 | 12/59 | Vulmiere | 313—113 |
| 2,929,922 | 3/60 | Schawlow. | |
| 2,939,984 | 6/60 | Edgerton | 315—241 |
| 3,136,959 | 6/64 | Culver | 331—94.5 |

OTHER REFERENCES

Article by Miles et al.: Optically Efficient Ruby Laser Pump, pages 740—741, Journal of Applied Physics for April 1961, vol. 32, No. 4.

Ciftan et al.: "A Ruby Laser with an Elliptic Configuration," Proc. of The IRE, volume 49, No. 5, May 1961, pages 960 and 961.

Collins et al.: "Coherence, Narrowing, Directionality and Relaxation Oscillations in the Light Emission From Ruby," Physical Review Letters, volume 5, No. 7, October 1, 1960, pages 303 to 305.

Stitch et al.: "Optical Ranging System Uses Laser Transmitter," Electronics, vol. 34, No. 16, April 21, 1961, pages 51 to 53.

JEWELL H. PEDERSEN, *Primary Examiner.*

GEORGE N. WESTBY, *Examiner.*